Patented May 20, 1941

2,242,235

UNITED STATES PATENT OFFICE 2,242,235

PROCESS FOR PREPARING CYCLOPROPANE

Frank C. Chase, Brooklyn, N. Y., assignor to E. R. Squibb & Sons, New York, N. Y., a corporation of New York No Drawing. Application June 11, 1938, Serial No. 213,191

7 Claims. (Cl. 260—666)

This invention relates to the preparation of cyclopropane, particularly an essentially pure cyclopropane for anesthetic use. Cyclopropane is a valuable general anesthetic, producing surgical anesthesia with comparative safety even at high levels of muscular relaxation and in extended surgical procedures, giving fairly short and uneventful induction and recovery periods.

Cyclopropane is a cyclic hydrocarbon having the structural formula

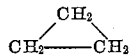

Heretofore it has been prepared by the treatment of trimethylene dihalides with a metal reduction agent, especially zinc, in aqueous alcohol [Gustavson J. Prakt. Chem (2) 50, 380 (1894); Lott and Christiansen, Jour. A. Ph. A. 19 (1930), 341], trimethylene dibromide giving the best results.

This process has been found to be objectionable, since a considerable quantity of hydrogen is formed by secondary reactions, especially when a dissolved salt of a metal displaceable by the metal reduction agent, e. g. a copper salt, is used to catalyze the primary reaction, as described and claimed in the copending application of W. A. Lott, Ser. No. 139,987, filed April 30, 1937 (now Patent No. 2,211,787). This generation of hydrogen gives rise to mechanical difficulties in the purification and recovery of the cyclopropane. Cyclopropane is a gas (B. P.,—34° C.) and the evolved gas mixture containing it is usually passed through a rectifying column to return vaporized alcohol, then through scrubbers into a refrigerated condenser or other apparatus for condensing the cyclopropane. Excessive amounts of non-condensable gases, such as hydrogen, interfere with the proper condensation of the alcohol, render the scrubbing less effective, interfere with the condensation of the cyclopropane, and decrease the yield of condensed cyclopropane.

It is the object of this invention to provide an efficient method of preparing cyclopropane without encountering excessive hydrogen formation.

In the practice of this invention, the reduction of trimethylene dihalides to cyclopropane is effected in an aqueous alcohol of which the alcohol content is, by volume, about 90 to 95%, preferably about 93%. The highest concentration of alcohol priorly used was about 86.5% (cf. Lott and Christiansen, supra), and it was indicated in the literature that increasing the concentration of the alcohol would result in a sluggish reaction and a decrease in yield of cyclopropane. Surprisingly, however, it has been found that increasing the alcohol concentration to about 90 to 95% results in a marked decrease of hydrogen evolution without materially affecting the induction period of the reaction or adversely affecting the yield. The invention is particularly advantageous when the reaction is effected in a vessel presenting to the reaction mixture a surface of metal different from the reduction agent, the generation of hydrogen being apparently promoted by the formation, under the reaction conditions, of a voltaic cell involving the two different metals. Thus, the hydrogen generation, when using an iron reactor, may be decreased more than 50% by increasing the alcohol concentration from 85 to 94%, for example.

Preferably, the metal reduction agent is in finely divided form. The concentrated aqueous alcohol may be ethyl or methyl or, preferably, a mixture thereof, e. g. ethyl alcohol denatured with methyl alcohol.

The following examples are illustrative of the invention:

Example 1

262 lbs. of zinc dust in 100 gallons of 93% alcohol is placed in an iron reaction vessel equipped with an agitator, and, while agitating and refluxing, 405 lbs. of trimethylene dibromide is gradually added. The cyclopropane evolved has a low hydrogen content and is recovered in excellent yield.

Example 2

In a Monel reactor equipped with a Monel agitator and shaft, there are placed 262 lbs. of zinc dust in 100 gallons of 93% alcohol and 6 quarts of a 5% solution of copper sulfate. While agitating and refluxing this mixture, 405 lbs. of trimethylene dibromide is gradually added. The evolved cyclopropane is low in hydrogen content and recoverable in excellent yield.

The invention may be variously otherwise embodied, within the scope of the appended claims.

I claim:

1. In the process of preparing cyclopropane in a reactor of metal different from the reduction agent, the step of reacting a trimethylene dihalide with a metal reduction agent in an about 90–95% by volume aqueous lower aliphatic alcohol.

2. In the process of preparing cyclopropane in a reactor of metal other than zinc, the step of reacting trimethylene dibromide with zinc in an about 90–95% by volume aqueous lower aliphatic alcohol.

3. In the process of preparing cyclopropane in a reactor of metal other than zinc, the step of reacting trimethylene dibromide with zinc in an about 93% by volume aqueous lower aliphatic alcohol.

4. In the process of preparing cyclopropane in a reactor of metal other than zinc, the step of reacting trimethylene dibromide with zinc in the presence of a dissolved salt of a metal other than zinc displaceable by zinc, as a catalyst, in an about 90-95% by volume aqueous lower aliphatic alcohol.

5. In the process of preparing cyclopropane in a reactor of metal other than zinc, the step of reacting trimethylene dibromide with zinc in the presence of copper sulfate in an about 90-95% by volume aqueous lower aliphatic alcohol.

6. In the process of preparing cyclopropane in a reactor of metal other than zinc, the step of reacting trimethylene dibromide with zinc in about 90-95% by volume aqueous ethyl alcohol.

7. In the process of preparing cyclopropane in a reactor of metal other than zinc, the step of reacting trimethylene dibromide with zinc in about 90-95% by volume aqueous ethyl alcohol denatured with methyl alcohol.

F. C. CHASE.